(12) United States Patent
Favaretto

(10) Patent No.: US 11,498,405 B2
(45) Date of Patent: Nov. 15, 2022

(54) FOUR-WHEEL DRIVE HYBRID VEHICLE COMPRISING AN INTERNAL COMBUSTION HEAT ENGINE PROVIDED WITH AN ELECTRIFIED TURBINE

(71) Applicant: FERRARI S.p.A., Modena (IT)

(72) Inventor: Fabrizio Favaretto, Formigine (IT)

(73) Assignee: FERRARI S.p.A., Modena (IT)

( * ) Notice: Subject to any disclaimer, the term of this patent is extended or adjusted under 35 U.S.C. 154(b) by 280 days.

(21) Appl. No.: 16/867,663

(22) Filed: May 6, 2020

(65) Prior Publication Data

US 2020/0353808 A1 Nov. 12, 2020

(30) Foreign Application Priority Data

May 9, 2019 (IT) .................. 102019000006696

(51) Int. Cl.
*B60K 6/26* (2007.10)
*F02B 39/10* (2006.01)
(Continued)

(52) U.S. Cl.
CPC ............... *B60K 6/26* (2013.01); *B60W 10/06* (2013.01); *F02B 39/10* (2013.01); *F02D 23/00* (2013.01); *F02D 13/0249* (2013.01)

(58) Field of Classification Search
CPC .......... B60K 6/26; B60K 6/52; B60W 10/06; B60W 10/08; B60W 20/15; B60W 20/19; B60W 30/188; B60Y 2400/435; B60Y 2400/44; F01N 5/04; F02B 33/34; F02B 37/10; F02B 39/10; F02B 41/10; F02D 13/0242; F02D 13/0249; F02D 2041/001;
(Continued)

(56) References Cited

U.S. PATENT DOCUMENTS 10,145,320 B1 12/2018 Zeng et al.
2006/0218923 A1 10/2006 Sopko et al.
(Continued)

FOREIGN PATENT DOCUMENTS

EP 2636876 A1 9/2013
WO 2016028836 A1 12/2016

OTHER PUBLICATIONS

Search Report issued in Italian Patent Application No. 201900006696, completed Jan. 21, 2020; 11 pages.

*Primary Examiner* — Grant Moubry
*Assistant Examiner* — Ruben Picon-Feliciano
(74) *Attorney, Agent, or Firm* — Cantor Colburn LLP

(57) ABSTRACT

A hybrid vehicle with four drive wheels having: an internal combustion heat engine, which transmits the motion to a first pair of drive wheels and has at least one cylinder provided with at least one intake valve and with an exhaust valve; a turbine, which is designed to be rotated by the exhaust gases; a first electric machine, which is designed to be rotated by the turbine so as to generate electrical energy; a second electric machine, which transmits the motion to a second pair of drive wheels; and a control unit, which is configured to cyclically determine an electric power to be necessarily generated and an electric power generated by the first electric machine and to adjust an opening advance of the exhaust valve depending on the difference between the electric power generated by the first electric machine and the electric power to be necessarily generated.

7 Claims, 2 Drawing Sheets

(51) Int. Cl.
   *F02D 23/00*      (2006.01)
   *B60W 10/06*      (2006.01)
   *F02D 13/02*      (2006.01)
(58) Field of Classification Search
   CPC ...... F02D 23/00; F02D 41/0007; Y02T 10/12;
   Y02T 10/62
   See application file for complete search history.

(56)     References Cited

U.S. PATENT DOCUMENTS

2009/0045629 A1* 2/2009 Vuk .......................... F02G 5/02
                                                    60/611
2016/0131054 A1   5/2016 Ulrey et al.
2017/0240038 A1* 8/2017 Spangler .............. B60W 10/119
2019/0063351 A1* 2/2019 Zeng ................... F02D 41/0007

* cited by examiner

FOUR-WHEEL DRIVE HYBRID VEHICLE COMPRISING AN INTERNAL COMBUSTION HEAT ENGINE PROVIDED WITH AN ELECTRIFIED TURBINE

CROSS-REFERENCE TO RELATED APPLICATIONS

This patent application claims priority from Italian patent application no. 102019000006696 filed on May 9, 2019, the entire disclosure of which is incorporated herein by reference.

TECHNICAL FIELD

The invention relates to a four-wheel drive hybrid vehicle comprising an internal combustion heat engine provided with an electrified turbine.

PRIOR ART

A hybrid vehicle comprises an internal combustion heat engine, which transmits a torque to the drive wheels by means of a drivetrain provided with a transmission, and at least one main electric machine, which is electrically connected to a power storage system and is mechanically connected to the drive wheels.

In some hybrid vehicles (such as the one described in patent application WO2016028836A1), the internal combustion heat engine is connected to a first pair of drive wheels (namely, the rear or front drive wheels), whereas the main electric machine s connected to a second pair of drive wheels (namely, to the front or rear drive wheels) and there is no direct mechanical connection between the internal combustion heat engine and the main electric machine; therefore, the internal combustion heat engine and the main electric machine can exchange torque (namely, energy) with one another only through the four drive wheels and the road surface.

As a consequence, there has to be an auxiliary electric machine, which is mechanically connected to the internal combustion heat engine and is exclusively used as electric generator to generate electrical energy to be subsequently used by the main electric machine (and to be generally at least partly stored, at first, in the power storage system).

As it is known, the internal combustion heat engine can be provided with a turbocharger supercharging system, which is capable of increasing the power developed by the internal combustion heat engine using the enthalpy of the exhaust gases to compress the air sucked in by the internal combustion heat engine and, hence, increase the volumetric efficiency of the intake.

A turbocharger supercharging system traditionally comprises a turbocharger provided with a turbine, which is arranged along an exhaust duct so as to rotate, at a high speed, due to the thrust of the exhaust gases expelled by the internal combustion heat engine, and with a compressor, which is caused to rotate by the turbine and is arranged along the air feeding duct to compress the air taken in by the internal combustion heat engine. The use of electrified turbochargers was recently suggested (for example, in patent application US2006218923A1), said electrified turbochargers comprising at least one reversible electric machine, which is fitted to the shaft shared by the compressor and by the turbine so as to operate as a motor increasing the rotation speed of the compressor (thus, eliminating the so-called turbo lag) or so as to operate as a generator exploiting the enthalpy of the exhaust gases to generate electrical energy. Alternatively, in an electrified turbocharger, the compressor can mechanically be completely independent of the turbine and there can be a first electric machine, which always and only works as motor and causes the rotation of the compressor, and a second electric machine, which always and only works as generator and is caused to rotate by the turbine.

DESCRIPTION OF THE INVENTION

The object of the invention is to provide a four-wheel drive hybrid vehicle comprising an internal combustion heat engine provided with an electrified turbine, said hybrid vehicle being as simple and as light as possible, though still offering high performances.

According to the invention, there are provided a four-wheel drive hybrid vehicle comprising an internal combustion heat engine provided with an electrified turbine.

The appended claims describe preferred embodiments of the invention and form an integral part of the description.

BRIEF DESCRIPTION OF THE DRAWINGS

The invention will now be described with reference to the accompanying drawings, showing a non-limiting embodiment thereof, wherein.

PREFERRED EMBODIMENTS OF THE INVENTION

Figure 1:
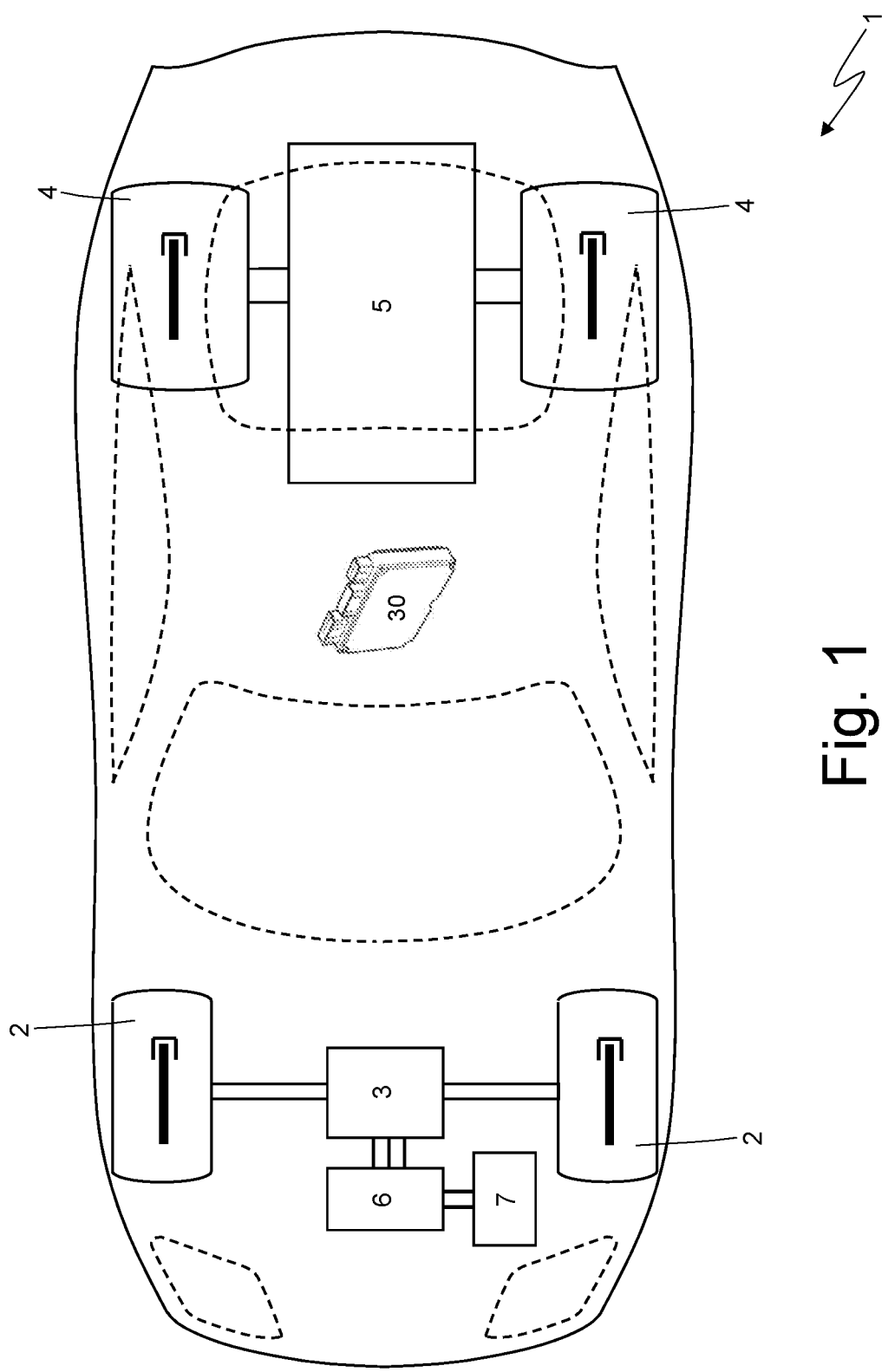
FIG. 1 is a schematic, plan view of a four-wheel drive hybrid vehicle according to the invention.

In FIG. 1, number 1 indicates, as a whole, a hybrid vehicle (or hybrid-drive vehicle) provided with two front drive wheels 2, which receive the torque from an electric machine 3, and with two rear drive wheel 4, which receive the torque from an internal combustion heat engine 5, which is completely separate from and independent of the electric machine 3 (namely, there is no direct mechanical connection between the internal combustion heat engine 5 and the electric machine 3).

The electric machine 3 is connected to the two front drive wheels 2 by means of a drivetrain system (which is known and, hence, is not shown) provided with a front differential; similarly, the internal combustion heat engine 5 is connected to the two rear drive wheels 4 by means of a drivetrain system (which is known and, hence, is not shown) provided with a transmission and with a rear differential, The electric machine 3 is reversible (namely, it can work both as an electric motor, thus absorbing electrical energy and generating a mechanical torque, and as an electric generator, thus absorbing mechanical energy and generating electrical energy) and is controlled by a control device 6 (in particular, an electronic AC/DC power converter, namely an "inverter"), which is connected to a power storage system 7 provided with chemical batteries. In this application the control device 6 is a two-way device and comprises a direct current side, which is connected to the storage system 7, and a three-phase alternating current side, which is connected to the electric machine 3.

Figure 2:
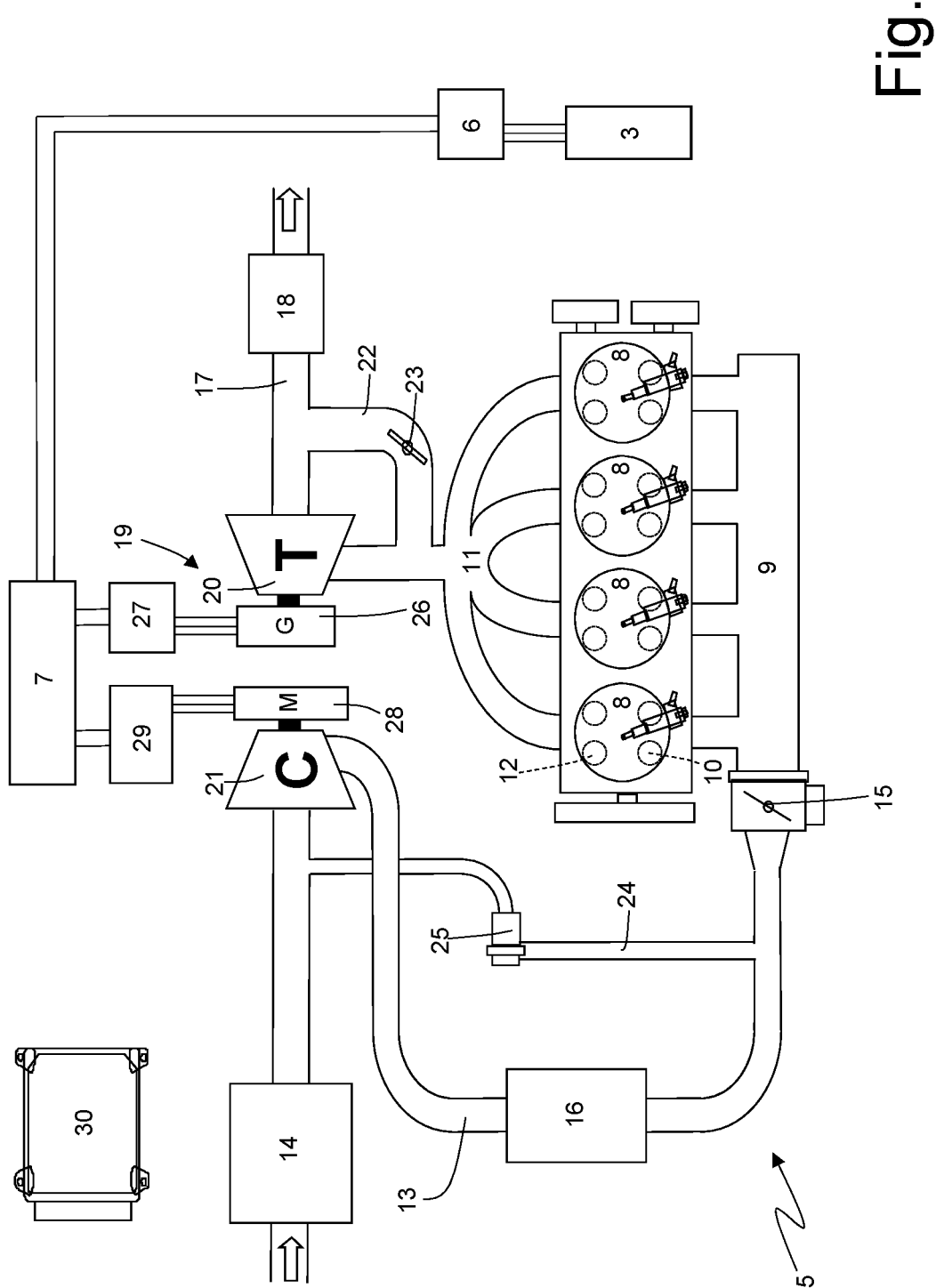
FIG. 2 is a schematic view of a supercharged internal combustion engine of the road vehicle of FIG. 1.

According to FIG. 2, the internal combustion heat engine 5 comprises four cylinders 8, each connected to an intake manifold 9 by means of two intake valves 10 and to an exhaust manifold 11 by means of two exhaust valves 12.

The valves 10 and 12 are operated by respective cams, which are caused to rotate by the drive shaft. The phases of the valves 10 and 12 do not normally coincide with the corresponding strokes of the piston established by the idealized cycle; since the accelerations imposed on the valves 10 and 12 cannot exceed certain limits concerning the resistance of the material used, the beginning of the movement of the valves 10 and 12 is advanced by 5°-15° so as to obtain a regular opening, without instantaneous jerks. At first, the movement of the valves 10 and 12 is minimum relative to the rotation of the cam and, then, the lift of the valves 10 and 12 increases proportionally to the rotation angle, until it reaches the maximum value in proximity to half stroke of the piston. In the case of the intake valves 10, in order to enable the maximum filling of the cylinder, the subsequent closing takes place with a significant delay, which ranges from 35° to 70° relative to the BDC (bottom dead centre); this allows for an exploitation of the mixture taken in, which, thanks to the speed gained keeps flowing into a cylinder 8 even when the piston starts lifting again.

Similarly, the exhaust valves 12 start their opening with an advance ranging from 35° to 65° relative to the BDC; in this last part of the stroke, the useful work produced by the expansion of the gases would anyway be very small, so that it is convenient to advance the exhaust stroke at the expense of the expansion stroke. The movement of the exhaust valves 12 takes place similarly to the one of the intake valves 10; the exhaust valves 12, however, close with a delay ranging from 2° to 30° relative to the TDC (top dead centre), so as to exploit the inertia of the gases, which, due to the speed gained, keep flowing out even though they are not pushed by the piston any longer.

The intake manifold 4 receives fresh air (i.e. air coming from the outside) through an intake duct 13, which is provided with an air filter 14 and is regulated by a throttle valve 15. Along the intake duct 13 there is an intercooler 16, which fulfils the function of cooling the air taken in. The exhaust manifold 11 is connected to an exhaust duct 17, which feeds the exhaust gases produced by the combustion to an exhaust system, which releases the gases produced by the combustion into the atmosphere and normally comprises at least one catalytic converter 18 and at least one silencer (not shown) arranged downstream of the catalytic converter 18.

The internal combustion heat engine 5 comprises a supercharging system comprising, in turn, a turbocharger 19 provided with a turbine 20, which is arranged along the exhaust duct 17 so as to rotate at a high speed due to the action of the exhaust gases expelled from the cylinders 8, and a compressor 21, which is arranged along the intake duct 13 to increase the pressure of the air fed by the feeding duct 13 ad is mechanically independent of the turbine 20 (namely, it does not have any mechanical connection to the turbine 20).

Along the exhaust duct 17 there is a bypass duct 22, which is connected in parallel to the turbine 20 so as to have its ends connected upstream and downstream of the turbine 20; along the bypass duct 22 there is a wastegate valve 23, which is designed to adjust the flow rate of the exhaust gases flowing through the bypass duct 22 and is controlled by an actuator (which is not shown). Along the exhaust duct 13 there is a bypass duct 24, which is connected in parallel to the compressor 21 so as to have its ends connected upstream and downstream of the compressor 21; along the bypass duct 25 there is a blowoff valve 25, which is designed to adjust the flow rate of the exhaust gases flowing through the bypass duct 24 and is controlled by an actuator (which is not shown).

The turbine 20 and the compressor 21 are not mechanically connected to one another and, therefore, they can be placed in different areas of the internal combustion heat engine 5. The turbine 20 is fitted to an electric generator 26, which is caused to rotate by the turbine 20 so as to generate electrical energy; the electric generator 26 is electrically connected to a control device 27 (in particular, an electronic AC/DC power converter), which, in turn, is connected to the storage system 7. The compressor 21 is fitted to an electric motor 28, which causes the compressor 21 to rotate; the electric motor 28 is electrically connected to a control device 29 (in particular, an electronic AC/DC power converter), which, in turn, is connected to the storage system 7.

The road vehicle 1 is controlled by a control unit 30, which controls the operation of all the components of the road vehicle 1, such as the electric machine 3 and the internal combustion heat engine 5.

When the road vehicle 1 is running, the control unit 30 uses the electric machine 3 as a motor, when a torque needs to be delivered to the front wheels 2 (for example, because of a need for a low-speed running in a merely electric mode or because the rear wheels 4 skid and cannot discharge all the torque requested by the driver to the ground), and uses the electric machine 3 as a generator, when the road vehicle 1 is slowing down.

Furthermore, during the operation of the internal combustion heat engine 5, the control unit 30 controls the electric motor 28, which causes the rotation of the compressor 21, and the electric generator 26, which is caused to rotate by the turbine 20, in a completely autonomous manner from one another. In other words, the control unit 30 controls the electric motor 28, which causes the compressor 21 to rotate, with the sole purpose of optimizing the intake of the cylinders 8 based on the requested performances (namely, in terms of torque and power to be delivered by the internal combustion heat engine 5); on the other hand, the control unit 30 controls the electric generator 26, which is caused to rotate by the turbine 20, with the sole purpose of optimizing the generation of electric energy, namely maximizing the electric power without jeopardizing the operation of the internal combustion heat engine 5.

Aside from the electrical energy generated by the electric machine 3 operating as generator (namely, when the road vehicle 1 is slowing down), the electrical energy on board the road vehicle 1 is generated by the sole electric generator 26; namely, aside from the electric machine 3, which can occasionally and briefly operate as generator, on board the road vehicle 1 the only means suited to generate electrical energy is the electric generator 26, which is caused to rotate by the turbine 20. In other words, on board the road vehicle 1 the only means suited to continuously generate electrical energy is the electric generator 26, which is caused to rotate by the turbine 20. Therefore, the road vehicle 1 completely lacks an electric machine which receives the motion from the drive shaft of the internal combustion heat engine 5 to generate electrical energy.

In use, the control unit 30 cyclically determines an electric power $P_{des}$ to be necessarily generated in order to deal with the electrical energy consumptions (of the electric machine 3, of the electric motor 28 and of other electric utilities, such as lights, control members, infotainment system . . . ) and, if necessary, in order to charge the storage system 7; furthermore, in use, the control unit 30 cyclically determines an electric power $P_{\mathit{eff}}$ generated by the electric generator 26.

In use, the control unit 30 controls the opening advance of the exhaust valves 12 depending on the difference between the electric power $P_{des}$ to be necessarily generated and the electric power $P_{eff}$ generated by the electric generator 26:

- if the electric power $P_{des}$ to be necessarily generated exceeds the electric power $P_{eff}$ generated by the electric generator 26, the opening advance of the exhaust valves 12 is increased (obviously, never exceeding a maximum value of the opening advance of the exhaust valves 12);
- if the electric power $P_{des}$ to be necessarily generated is (approximately) the same as the electric power $P_{eff}$ generated by the electric generator 26, the opening advance of the exhaust valves 12 is kept constant; and
- if the electric power $P_{des}$ to be necessarily generated is smaller than the electric power $P_{eff}$ generated by the electric generator 26, the opening advance of the exhaust valves 12 is reduced (obviously, never going below a minimum value of the opening advance of the exhaust valves 12, which maximizes the energy efficiency of the internal combustion heat engine 5).

Obviously, the internal combustion heat engine 5 must be provided with a (known) system for the variation of the timing of the cams controlling (at least) the exhaust valves 12. Furthermore, it should be pointed out that the minimum value of the opening advance of the exhaust valves 12 is an ideal value, which maximizes the energy efficiency of the internal combustion heat engine 5 completely independently of the electrical energy generation needs; on the other hand, the maximum value of the opening advance of the exhaust valves 12 is a limit value, which avoids excessively jeopardizing the energy efficiency of the internal combustion heat engine 5. Moreover, the minimum and maximum values of the opening advance of the exhaust valves 12 could be fixed or could change depending on the engine point of the internal combustion engine 5.

In other words, when the generation of electrical energy needs to be increased (for example, when driving along a motorway at a substantially constant speed, when the exhaust gases normally have a relevant enthalpy), the control unit 30 controls the internal combustion heat engine 5 so as to maximize the energy efficiency (namely, so as to use the minimum value of the opening advance of the exhaust valves 12, which maximizes the energy efficiency of the internal combustion heat engine 5); obviously, if the electric power $P_{eff}$ generated by the electric generator 26 exceeds the electric power $P_{des}$ to be necessarily generated, the excess electric power is stored in the storage system 7 or is used to increase the use of the electric machine 3 operating as motor. On the other hand, when the generation of electrical energy needs to be increased (for example, when driving in city centres with a heavy traffic, when the internal combustion heat engine 5 almost always idles and, hence, the exhaust gases normally have a modest enthalpy), the control unit 30 controls the internal combustion heat engine 5 damaging (worsening) the energy efficiency in order to increase the mechanical power generated by the turbine 20 (namely, absorbed by the electric generator 26); in other words, in order to increase the enthalpy of the exhaust gases, the control unit 30 increases the opening advance of the exhaust valves 12 so as to cause the exhaust gases to flow out of the exhaust valves 12 and towards the exhaust manifold 11 at a higher pressure (thus, not using this higher pressure to push the pistons and, hence, to generate mechanical energy inside the internal combustion heat engine 5).

From a certain point of view, by increasing the opening advance of the exhaust valves 12, a sort of Brayton-Joule cycle is used, in which the air is compressed and heated inside the cylinders 8 (namely, the cylinders 8 serve as compression and combustion chamber) and, subsequently, it is caused to expand (partly, since part of the expansion takes place anyway inside the cylinders 8 in order to at least support the idle running of the internal combustion heat engine 5) in the turbine 20 so as to cause the rotation of the electric generator 26. Indeed, by advancing the opening of the exhaust valves 12, the exhaust gases only partly expand inside the cylinders 8 and, for the remaining part, they expand in the turbine 20 so as to cause the rotation of the electric generator 26.

In the embodiment shown in the accompanying figures, the turbine 20 is mechanically independent of the compressor 21 and, therefore, there are, for the supercharging system, two distinct electric machines: the electric generator 26, which is caused to rotate by the turbine 20, and the electric motor 28, which causes the rotation of the compressor 21. According to a different embodiment which is not shown herein, the turbine 20 and the compressor 21 are mounted on the same shaft (hence, they always rotate together at the same speed) and the supercharging system comprises one single reversible electric machine, which is mounted on the same shaft as the turbine 20 and the compressor 21 and can work as a generator (operated by the turbine 20) and, if necessary, also as a motor (for short instants, so as eliminate the turbocharger response delay); in other words, in this embodiment, the single reversible electric machine of the supercharging system almost always acts as generator (operated by the turbine 20) and occasionally and for short instants as motor so as eliminate the turbocharger response delay).

In the embodiment shown in the accompanying figures, there is the compressor 20 (with the relative electric motor 28), which increases the intake pressure; according to a different embodiment which is not shown herein, the compressor 20 (with the relative electric motor 28) is not present and, therefore, the internal combustion heat engine 5 is not supercharged (namely, it is an aspirated engine).

The embodiments described herein can be combined with one another, without for this reason going beyond the scope of protection of the invention.

The road vehicle 1 described above has numerous advantages.

First of all, the road vehicle 1 described above is capable of generating all the electric power needed in any possible operating condition, namely it is capable of increasing or decreasing, in any possible operating condition and according to the needs, the electric power $P_{eff}$ generated by the electric generator 26. In particular, it is possible to generate a relevant electric power $P_{eff}$ even when the internal combustion heat engine 5 idles, using a large advance of the opening of the exhaust valves 12 so as to allow the exhaust gases to flow out of the cylinders 8 at a high pressure.

Furthermore, the road vehicle 1 described above is not provided with an electric generator which is (directly or indirectly) caused to rotate by the drive shaft of the internal combustion heat engine 5, with a consequent reduction of costs, dimensions and weight.

Finally, the road vehicle 1 described above is simple to be manufactured, as it only requires the use of known components available in the market.

LIST OF THE REFERENCE NUMBERS OF THE FIGURES 1 road vehicle
2 front wheels 3 electric machine
4 rear wheels
5 internal combustion heat engine
6 control device
7 storage system
8 cylinders
9 intake manifold
10 intake valves
11 exhaust manifold
12 exhaust valves
13 intake duct
14 air filter
15 throttle valve
16 intercooler
17 exhaust duct
18 catalytic converter
19 turbocharger
20 turbine
21 compressor
22 bypass duct
23 wastegate valve
24 bypass duct
25 blowoff valve
26 electric generator
27 control device
28 electric motor
29 control device
30 control unit

The invention claimed is:

1. A hybrid vehicle (1) with four drive wheels (2, 4) comprising:
    an internal combustion heat engine (5), which transmits a rotational motion to a first pair of drive wheels (4) and has at least one cylinder (8) provided with at least one intake valve (10) and with an exhaust valve (12);
    a single-stage turbine (20) within the hybrid vehicle, which is designed to be rotated by the exhaust gases flowing out of the cylinder (8) through the exhaust valve (12), wherein the single-stage turbine (20) is the only turbine within the hybrid vehicle;
    a compressor (21), which is designed to increase an intake pressure of the cylinder (8) and is directly caused to rotate by the single-stage turbine (20) to which it is mechanically connected;
    a first electric machine (26), which is designed to be rotated by the single-stage turbine (20) so as to generate electrical energy;
    a second electric machine (3), which transmits a rotational motion to a second pair of drive wheels (2) and has no direct mechanical connection to the internal combustion heat engine (5); and
    a control unit (30);
    wherein the first electric machine (26), the compressor (21) and the single-stage turbine (20) are mounted on the same shaft;
    wherein first electric machine (26) functions as a generator operated by the single-stage turbine (20) and as a motor;
    wherein the hybrid vehicle (1) completely lacks an electric machine which receives a rotational motion from a shaft of the internal combustion heat engine (5);
    wherein the control unit (30) is configured to cyclically determine: an electric power ($P_{des}$) to be necessarily generated and an electric power ($P_{eff}$) generated by the first electric machine (26); and
    wherein the control unit (30) is configured to adjust an opening advance of the exhaust valve (12) depending on the difference between the electric power ($P_{eff}$) generated by the first electric machine (26) and the electric power ($P_{des}$) to be necessarily generated.

2. The hybrid vehicle (1) according to claim 1, wherein the control unit (30) is configured to increase the opening advance of the exhaust valve (12), if the electric power ($P_{des}$) to be necessarily generated is greater than the electric power ($P_{eff}$) generated by the first electric machine (26).

3. The hybrid vehicle (1) according to claim 2, wherein the control unit (30) is configured not to increase the opening advance of the exhaust valve (12) beyond a maximum value.

4. The hybrid vehicle (1) according to claim 1, wherein the control unit (30) is configured to decrease the opening advance of the exhaust valve (12), if the electric power ($P_{des}$) to be necessarily generated is greater than the electric power ($P_{eff}$) generated by the first electric machine (26).

5. The hybrid vehicle (1) according to claim 4, wherein the control unit (30) is configured not to decrease the opening advance of the exhaust valve (12) beyond a minimum value.

6. The hybrid vehicle (1) according to claim 5, wherein the minimum value allows the energy efficiency of the internal combustion heat engine (5) to be maximized.

7. The hybrid vehicle (1) according to claim 1, wherein the control unit (30) is configured to keep the opening advance of the exhaust valve (12) constant, if the electric power ($P_{des}$) to be necessarily generated is equal to the electric power ($P_{eff}$) generated by the first electric machine (26).

* * * * *